United States Patent

Yonezawa

[11] Patent Number: 5,746,285
[45] Date of Patent: May 5, 1998

[54] RACK SUPPORTING DEVICE

[75] Inventor: Masami Yonezawa, Ito-gun, Japan

[73] Assignee: Koyo Seiko Co., Ltd., Osaka, Japan

[21] Appl. No.: 715,700

[22] Filed: Sep. 19, 1996

[30] Foreign Application Priority Data

Sep. 19, 1995 [JP] Japan ................................. 7-266516

[51] Int. Cl.$^6$ ................................................. B62D 3/12
[52] U.S. Cl. ........................... 180/428; 74/422; 74/498
[58] Field of Search ...................... 74/422, 498; 280/771; 180/400, 426, 427, 428

[56] References Cited

U.S. PATENT DOCUMENTS

| | | |
|---|---|---|
| 4,593,578 | 6/1986 | Kobayashi et al. ............... 180/428 |
| 5,660,078 | 8/1997 | Phillips ............................. 74/498 |

FOREIGN PATENT DOCUMENTS 6-56042  3/1994  Japan .

*Primary Examiner*—Paul N. Dickson
*Attorney, Agent, or Firm*—Reid & Priest LLP

[57] ABSTRACT

A supporting element guided in the back and forth direction by the inner circumferential face of a guide hole of a housing is made of a pair of half pieces. The back face of the rack is supported by the front ends of the half pieces. Both half pieces are pressed to the back of the rack and to the inner circumferential face of the guide hole. The inner circumferential face of the guide hole is arranged on a first fictitious cylindrical face having an axis along the back and forth direction. The outer circumferential face of each of the half pieces has a small diameter portion and a great diameter portion. The small diameter portion is arranged on a second fictitious cylindrical face, which has an axis along the back and forth direction and the diameter of which is smaller than that of the first fictitious cylindrical face. The great diameter portion is arranged on a third fictitious cylindrical face having an axis along the back and forth direction and the diameter of which is greater than that of the first fictitious cylindrical face. The outer circumferential face of each of the half pieces is in contact with the inner circumferential face of the guide hole at both circumferential ends of the great diameter portion.

4 Claims, 6 Drawing Sheets

RACK SUPPORTING DEVICE

FIELD OF THE INVENTION

The present invention relates to a device suitable for supporting the rack in a rack and pinion type steering device.

DESCRIPTION OF RELATED ART

The rack and pinion type steering device has a pinion rotated by steering operation and a rack engaged with the pinion, and vehicle wheels are steered by the axial movement of the rack.

FIG. 8 (1) illustrates a conventional supporting device for a rack 101. The supporting device has a supporting element 104, which is inserted in a guide hole 103 formed in a rack housing 102 so as to be guided in the back and forth direction (left and right direction in the figure) by the inner circumferential face of the guide hole 103. The inner circumferential face of the guide hole 103 is arranged on a first fictitious cylindrical face, which has an axis along the back and forth direction. The outer circumferential face of the supporting element 104 is arranged on a second fictitious cylindrical face, which has an axis along the back and forth direction and the diameter of which is smaller than that of the first fictitious cylindrical face. The front end of the supporting element 104 constitutes a supporting face concaved according to the curvature of the back face of the rack 101. The back face of the rack 101 is supported by the supporting face via a sheet 105.

The supporting element 104 is made up of a pair of half pieces 104a and 104b, which are arranged vertically in the figure. The front ends of both half pieces 104a and 104b constitute the supporting face. A hollow 106 is formed by concaving both half pieces 104a and 104b in the rear side of the supporting element 104. The hollow 106 has a pressure receiving face 106a formed therein along a conical face, so that the face 106a approaches the inner circumferential face of the guide hole 103 with going from its front end to rear end. The pressure receiving face 106a is in contact with the outer circumferential face 107b of a pressing element 107, the circumferential face 107b of which constitutes a part of a spherical face. A spring 108 exerting an elastic force on both half pieces 104a and 104b via the pressing element 107 is supported by the housing 102. Because the pressure receiving face 106a approaches the inner circumferential face of the guide hole 103 with going from its front end to rear end, the elastic force of the spring 108 can be divided into two components, one component force of which presses both half pieces 104a and 104b to the back face of the rack 101, and the other component force presses both half pieces 104a and 104b to the inner circumferential face of the guide hole 103. A regulation element 109 attached to the housing 102 is arranged at the backward of the pressing element 107 via an adjustable gap δ. Since the pressing element 107 can come in contact with the regulation element 109, the distance of backward shift of the supporting element 104 from the rack 101 is limited to a preset range.

The supporting element 104 presses the teeth of the rack 101 against the teeth of the pinion to ensure backlash-free smooth transmission of rotation from the pinion. The supporting element 104 moves in the back and forth direction to absorb the bending of the rack 101, the tolerance for the tooth cutting of the rack 101, and the like. By limiting the distance of backward shift of the supporting element 104 from the rack 101 to a preset range by the pressing element 107, the distance of backward shift is prevented from being in excess, whereby poor engagement of the rack 101 with the pinion is prevented. By pressing each of the half pieces 104a and 104b against the inner circumferential face of the guide hole 103, the instability of the supporting element 104 and the reduction in the capability of the rack 101 to follow up the rotation of the pinion had been intended to prevented, and the sound of collision between the teeth of the rack 101 and the teeth of the pinion had been intended to prevented from being increased.

However, the conventional rack supporting device is problematic in that it is impossible to well prevent the reduction in the capability of the rack to follow up the pinion rotation and the increment of the sound of collision between the rack teeth and the pinion teeth. These problems result in decreased steering feeling and noise in rack and pinion type steering devices.

Regarding the causes of the reduction in the capability of the rack to follow up the pinion rotation and the increment of the sound of collision between the rack teeth and the pinion teeth in the conventional rack supporting device, the following fact has been elucidated.

In the conventional rack supporting device, the inner circumferential face of the guide hole 103 is arranged on the first fictitious cylindrical face, which has an axis along the back and forth direction, while the outer circumferential face of the supporting element 104 is arranged on the second fictitious cylindrical face, which has an axis along the back and forth direction and the diameter of which is smaller than that of the first fictitious cylindrical face. Consequently, as illustrated in FIG. 8 (2), when each of the half pieces 104a and 104b is pressed against the inner circumferential face of the guide hole 103 by the elastic force of the spring 108, the outer circumferential face of each of the half pieces 104a and 104b comes in contact with the inner circumferential face of the guide hole 103 at one point P alone, therefore a gap w is formed between the outer circumferential face of each of the half pieces 104a and 104b and the inner circumferential face of the guide hole 103 at the area other than the contact point P. By such a gap w, each of the half pieces 104a and 104b starts to rotate from the point P contacting with the inner circumferential face of the guide hole 103 as shown by the arrow in FIG. 8 (2). Therefore, the supporting of the rack 101 by the supporting element 104 becomes unstable, so that the capability of the rack 101 to follow up the pinion rotation is reduced and the sound of collision between the teeth of the rack 101 and the teeth of the pinion is increased.

The object of the present invention is to provide a rack supporting device overcoming the above problems.

SUMMARY OF THE INVENTION

The present invention is a supporting device for a rack engaged with a pinion, comprising a housing having a guide hole, a supporting element inserted into the guide hole so as to be guided in the back and forth direction by the inner circumferential face of the guide hole, the supporting element being made up of a pair of half pieces, the front ends of which support the back face of the rack, means for exerting an elastic force to press both half pieces to the back face of the rack and to the inner circumferential face of the guide hole, the inner circumferential face of the guide hole being arranged on a first fictitious cylindrical face having an axis along the back and forth direction, the outer circumferential face of each of the half pieces having a small diameter portion and a great diameter portion, the small diameter portion being arranged on a second fictitious cylindrical face, which has an axis along the back and forth direction and the diameter of which is smaller than that of the first fictitious cylindrical face, the great diameter portion being arranged on a third fictitious cylindrical face, which has an axis along the back and forth direction and the diameter of which is greater than that of the first fictitious cylindrical face, and the outer circumferential face of each of the half pieces being in contact with the inner circumferential face of the guide hole at both circumferential ends of the great diameter portion.

According to the constitution of the present invention, both circumferential ends of the great diameter portion of the outer circumferential face of each half piece can be pressed against the inner circumferential face of the guide hole by the elastic force of a spring. In other words, each half piece can be pressed against the inner circumferential face of the guide hole at two or more points which are apart from each other along the circumferential direction. It is therefore possible to prevent each half piece from rotating from the points contacting with the inner circumferential face of the guide hole, whereby the supporting of the rack by the supporting element can be stabilized.

It is preferable that each of the half pieces is made from sintered metal, and that the small diameter portion and the great diameter portion of the outer circumferential face of each of the half pieces are smoothly continuous with each other.

When each half piece, which is formed by sintering metal powder compressed in a mold, has a complex shape, the mold designing becomes difficult, mechanical strength of each half piece is reduced because stress concentration is apt to generate, and the rate of contraction during sintering is ununiformed due to a lack of density uniformity resulting in reduced dimensional precision of each half piece.

On the other hand, by smooth continuity between the small diameter portion and the great diameter portion in each half piece, the mold designing is facilitated because of simplification of the shape of each half piece, the reduction in strength of each half piece is prevented because of inhibition of the stress concentration, and the reduction in dimensional precision of each half piece is prevented because of the uniformization of the rate of contraction during sintering owing to the uniformization of the density.

It is preferable that there are a plurality of small diameter portions, and that the great diameter portion is arranged between the small diameter portions, whereby stabilization of each half piece is ensured.

According to the rack supporting device of the present invention, the reduction in the capability of the rack to follow up the pinion rotation and the increment of the sound of collision between the rack teeth and the pinion teeth are prevented. Furthermore, when each half piece supporting the rack is made from sintered metal, the mold designing is facilitated and the reduction in strength and dimensional precision can be prevented.

BRIEF DESCRIPTION OF THE DRAWINGS

FIG. 8 (2) is a sectional rear view illustrating the problems in the conventional rack supporting device.

DETAILED DESCRIPTION OF A PREFERRED EMBODIMENT

A preferred embodiment of the present invention is hereinafter described with reference to drawings.

Figure 1:
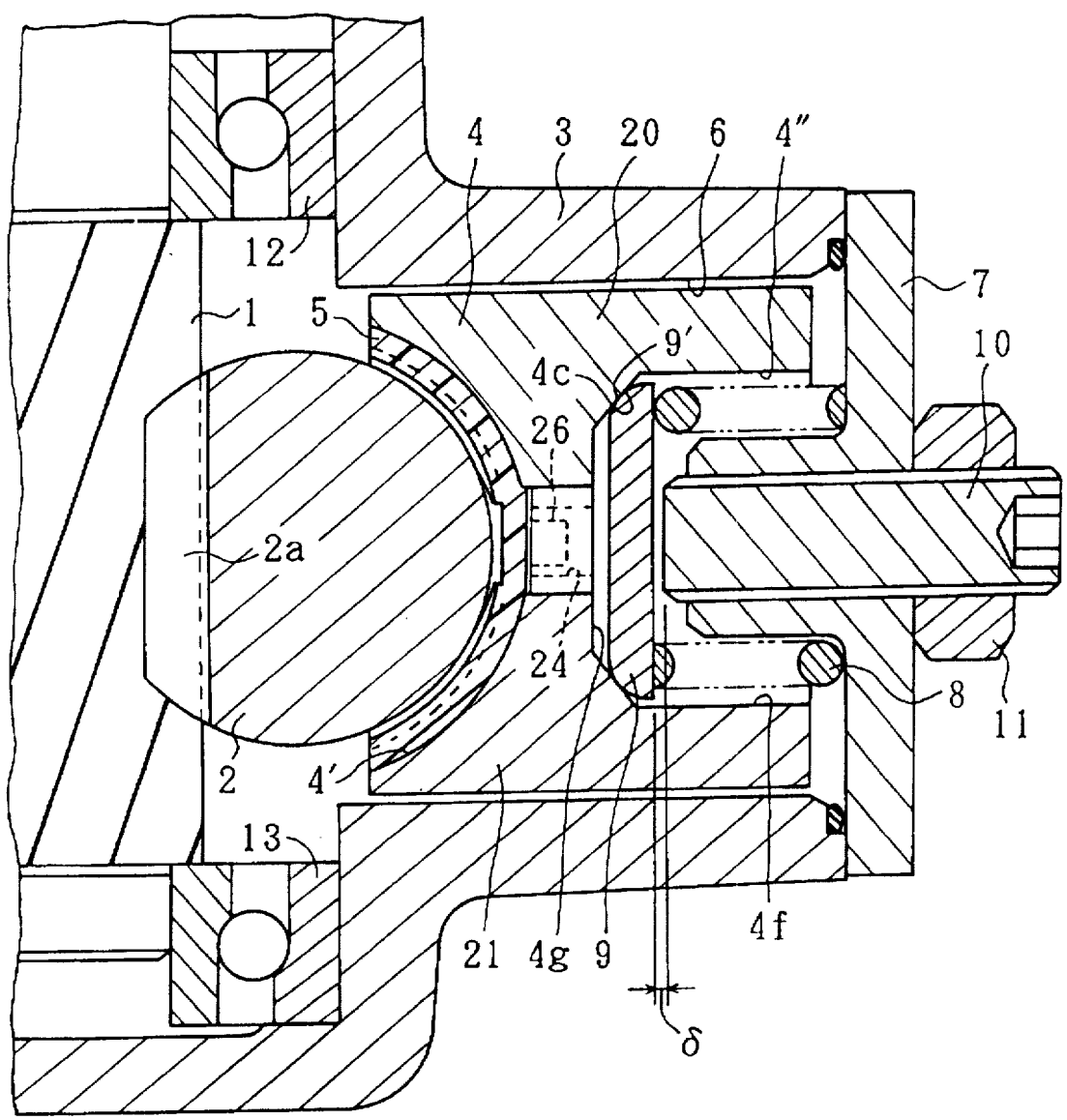
FIG. 1 is a sectional view of the rack supporting device of an embodiment of the present invention.

A rack and pinion type steering device illustrated in FIG. 1 has a helical pinion 1 joined to a steering wheel (not illustrated), a helical rack 2 having teeth 2a on its front side (left side in FIG. 1) so as to be engaged with the teeth of the pinion 1, and a housing 3 covering the rack 2. The direction oriented to the pinion 1 from the rack 2 at right angle to the axis of the rack 2 is defined as the forward direction. The pinion 1 is supported by the housing 3 via bearings 12 and 13. Vehicle wheels are joined to both ends of the rack 2. By shifting the rack 2 in the vehicle's width direction upon rotation of the pinion 1 by steering wheel operation, the vehicle is steered.

Figure 3:
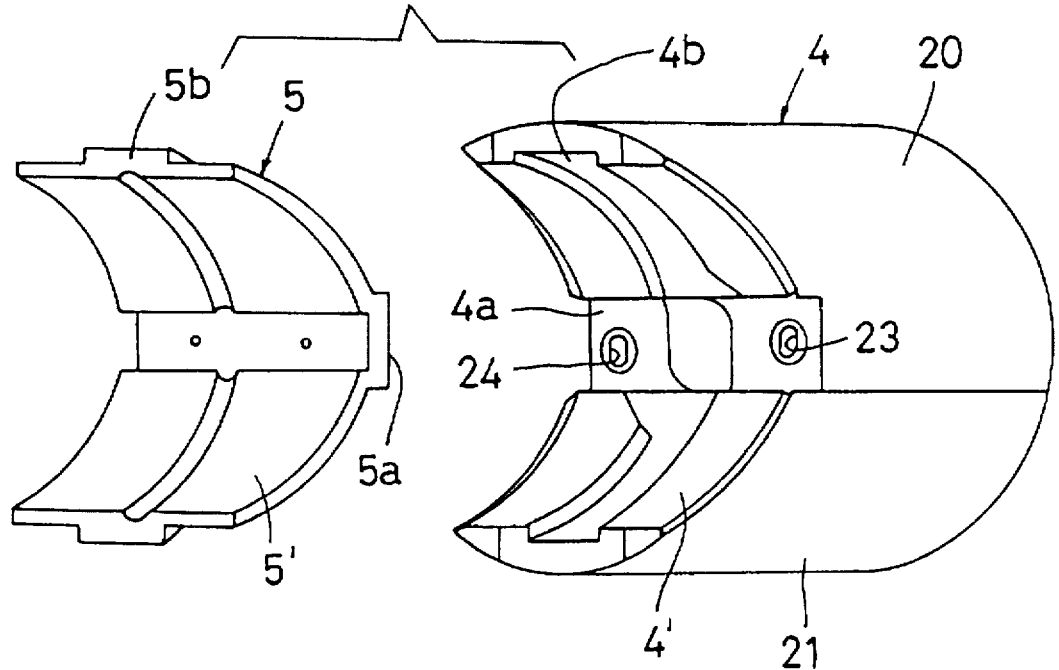
FIG. 3 is a perspective view of the support yoke and sheet of the embodiment of the present invention.
Figure 6:
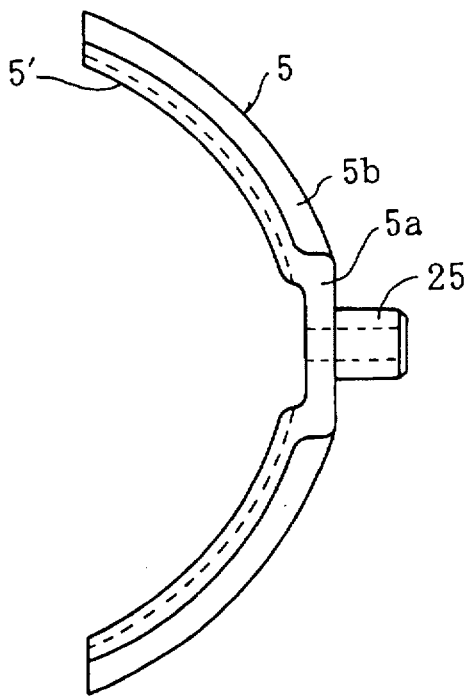
FIG. 6 is a side view of the sheet of the embodiment of the present invention.
Figure 7:
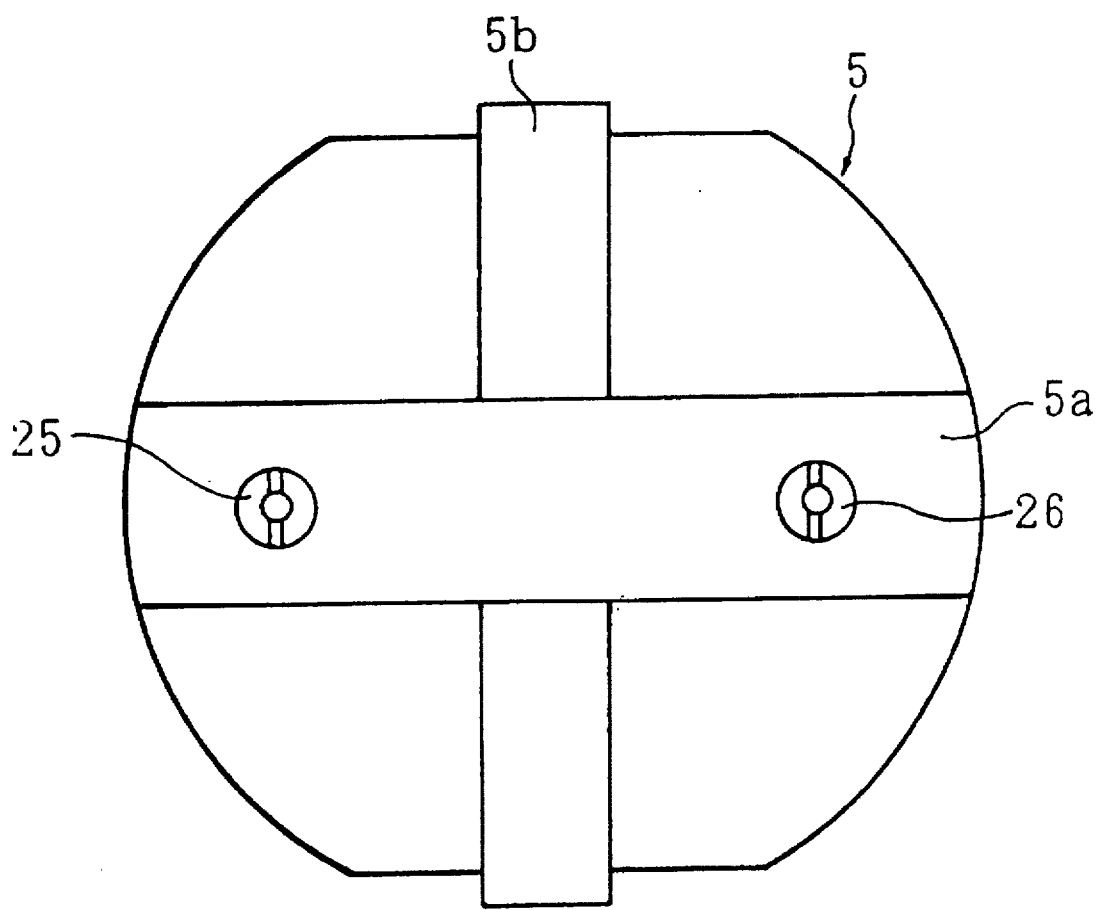
FIG. 7 is a rear view of the sheet of the embodiment of the present invention.
Figure 8A:
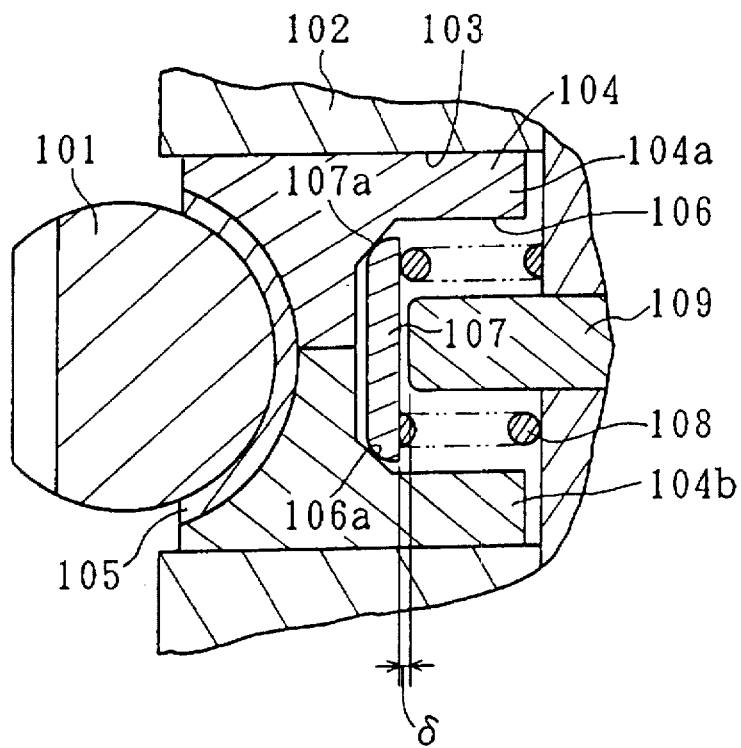
FIG. 8 (1) is a cross-sectional view of a conventional rack supporting device.
Figure 8B:
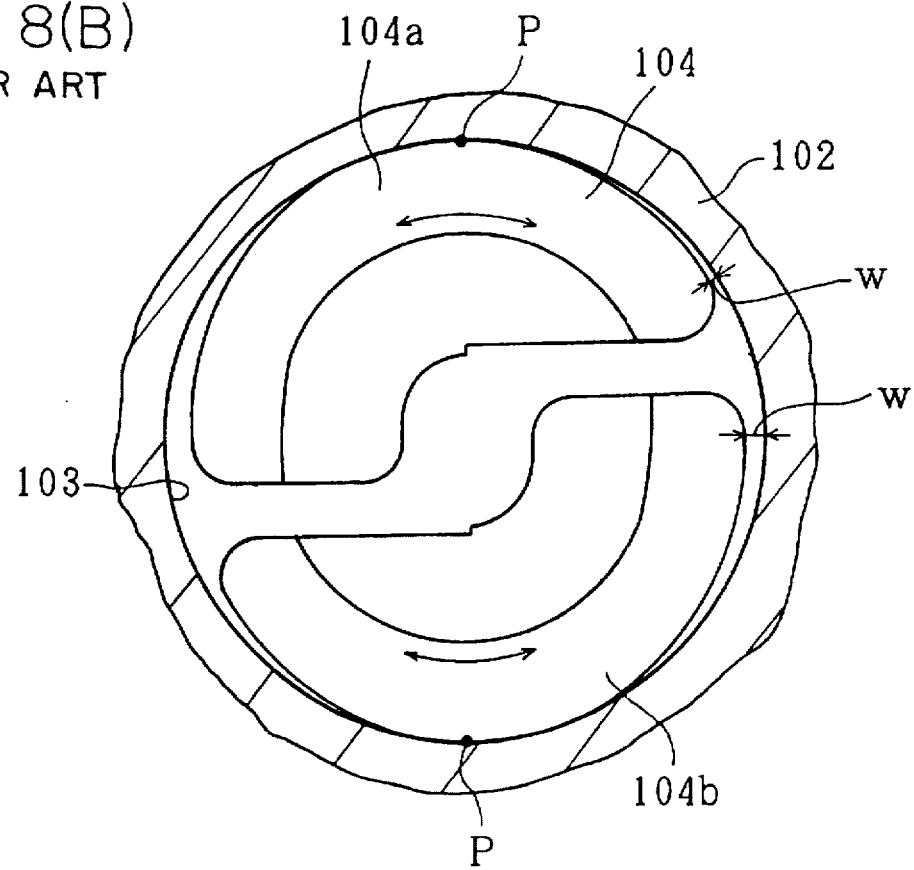

A support yoke (supporting element) 4 made from sintered metal is inserted into a guide hole 6 formed in the housing 3 so as to be shiftable in the back and forth direction. The support yoke 4 is guided in the back and forth direction by the inner circumferential face of the guide hole 6. The inner circumferential face of the guide hole 6 is arranged on a first fictitious cylindrical face having an axis along the back and forth direction. A synthetic resin sheet 5 is present between the support yoke 4 and the back face of the rack 2. As illustrated in FIG. 3, the front end of the support yoke 4 constitutes a supporting face 4' concaved according to the curvature of the back face of the rack 2. As illustrated in FIGS. 3, 6 and 7, the back face of the sheet 5 is supported by the supporting face 4' of the support yoke 4. The front face of the sheet 5' constitutes a supporting face 5' curved according to the curvature of the back face of the rack 2. A lateral groove 4a and a longitudinal groove 4b are formed in a cross shape in the supporting face 4' of the support yoke 4. Projections 5a and 5b engaged with the grooves 4a and 4b are formed in a cross shape in the back face of the sheet 5.

Figure 4:
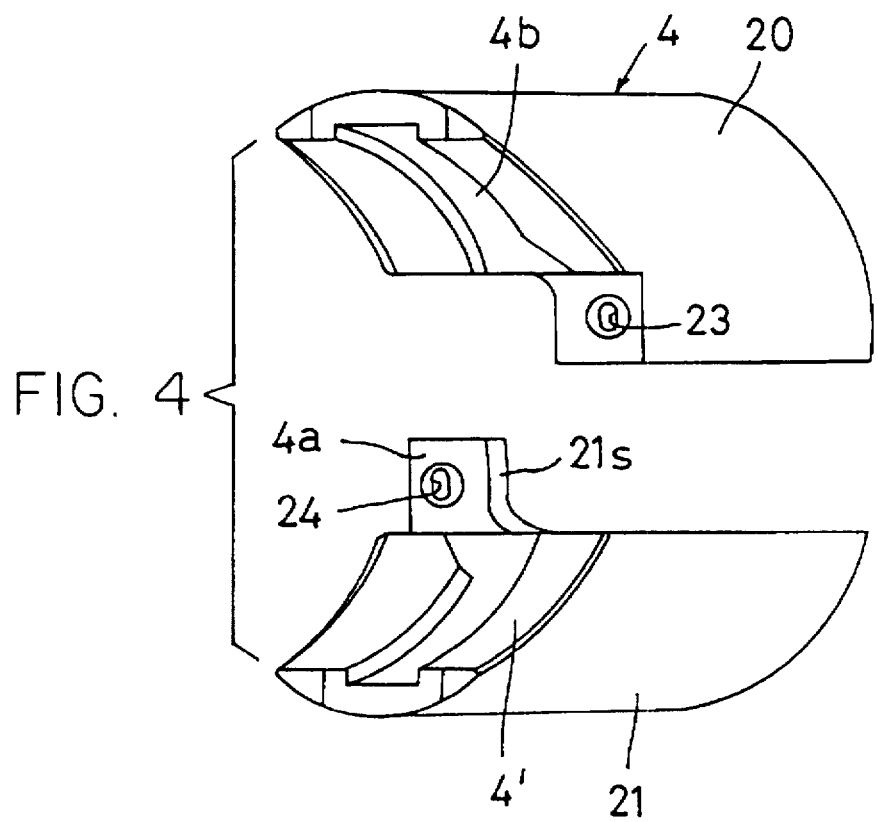
FIG. 4 is a perspective view of the support yoke of the embodiment of the present invention.

As illustrated in FIG. 4, the support yoke 4 is made up of a pair of half pieces 20 and 21, which are arranged vertically. The direction perpendicular to the axis of the rack 2 and also perpendicular to the back and forth direction is defined as the vertical direction. The front ends of both half pieces 20 and 21 constitute the abovementioned supporting face 4' which supports the back face of the rack 2 via the sheet 5.

Figure 5:
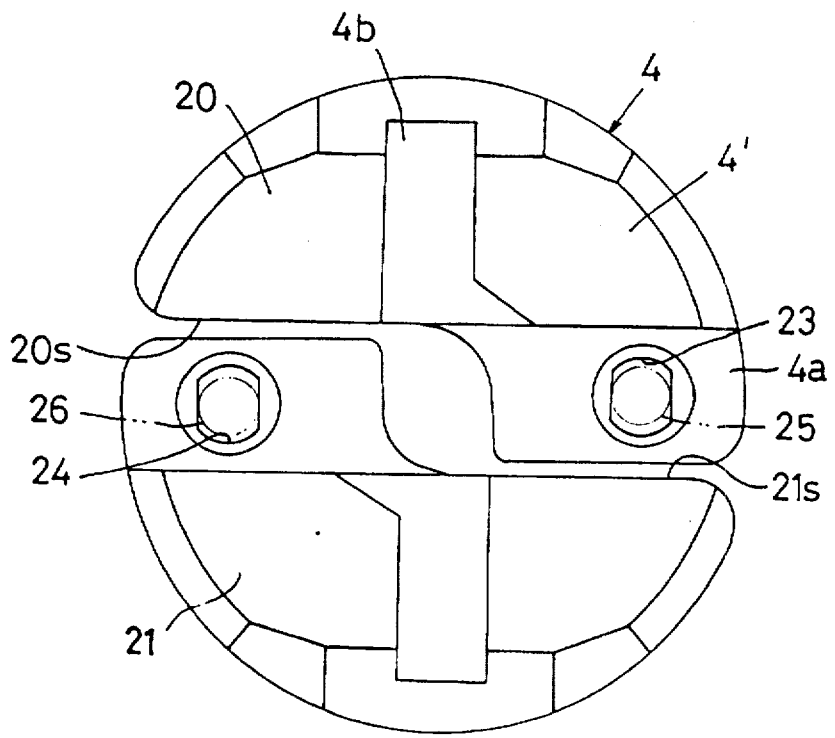
FIG. 5 is a front view of the support yoke of the embodiment of the present invention.

As illustrated in FIG. 5, the faces 20s and 21s of the half pieces 20 and 21 opposite to each other are arranged along the upper edge of the abovementioned lateral groove 4a on the left side in the drawing, along the lower edge of the lateral groove 4a on the right side in the drawing, and across the lateral groove 4a at the center in the drawing. Vertically elongated long holes 23 and 24 are formed from the base of the lateral groove 4a to backward. The back face of the sheet 5 has a pair of cylindrical projections 25 and 26 extending to backward from the abovementioned projection 5a. One cylindrical projection 25 is fitted into the long hole 23 of one half piece 20 so as to be shiftable in the vertical direction, and the other cylindrical projection 26 is fitted into the long hole 24 of the other half piece 21 so as to be shiftable in the vertical direction. This constitution makes each of the half pieces 20 and 21 shiftable toward the inner circumferential face of the guide hole 6 relative to the sheet 5. The diameter of each of the cylindrical projections 25 and 26 is slightly great than the minor diameter of each of the long holes 23 and 24, whereby the sheet 5 is prevented from being detached down from the support yoke 4.

As illustrated in FIG. 1, a hollow 4" is formed by concaving both half pieces 20 and 21 in the rear side of the support yoke 4. The hollow 4" has an inner circumferential face 4f arranged on a fictitious cylindrical face concentric to the abovementioned first fictitious cylindrical face, a base face 4g along the vertical direction, and a pressure receiving face 4c between the inner circumferential face 4f and the base face 4g. The pressure receiving face 4c is formed along a conical face, so that the face 4c approaches the inner circumferential face of the guide hole 6 with going from its front end to rear end. A metal pressing element 9 and a compression coil spring 8 is inserted in the hollow 4". The pressing element 9 has a disc form. The outer circumferential face 9' of the pressing element 9 constitutes a part of a spherical face so that its diameter at its front end is smaller than that at its rear end. The pressure receiving face 4c and the outer circumferential face 9' of the pressing element 9 are in contact with each other. The pressing element 9 is in contact with one end of the spring 8. The other end of the spring 8 is in contact with a cover 7 attached to the housing 3. By this constitution, the elastic force of the spring 8 is divided into two components, one component force of which presses both half pieces 20 and 21 to the back face of the rack 2 via the pressing element 9, and the other component force presses both half pieces 20 and 21 to the inner circumferential face of the guide hole 6 via the pressing element 9.

An adjusting screw (regulation element) 10 screwed in the cover 7 is arranged at the backward of the pressing element 9 via a gap δ. The gap δ is changeable by rotation of the adjusting screw 10. The adjusting screw 10 is screwed with a lock nut 11. Since the pressing element 9 can come in contact with the adjusting screw 10, the distance of backward shift of the support yoke 4 from the rack 2 is limited to a preset range.

Figure 2:
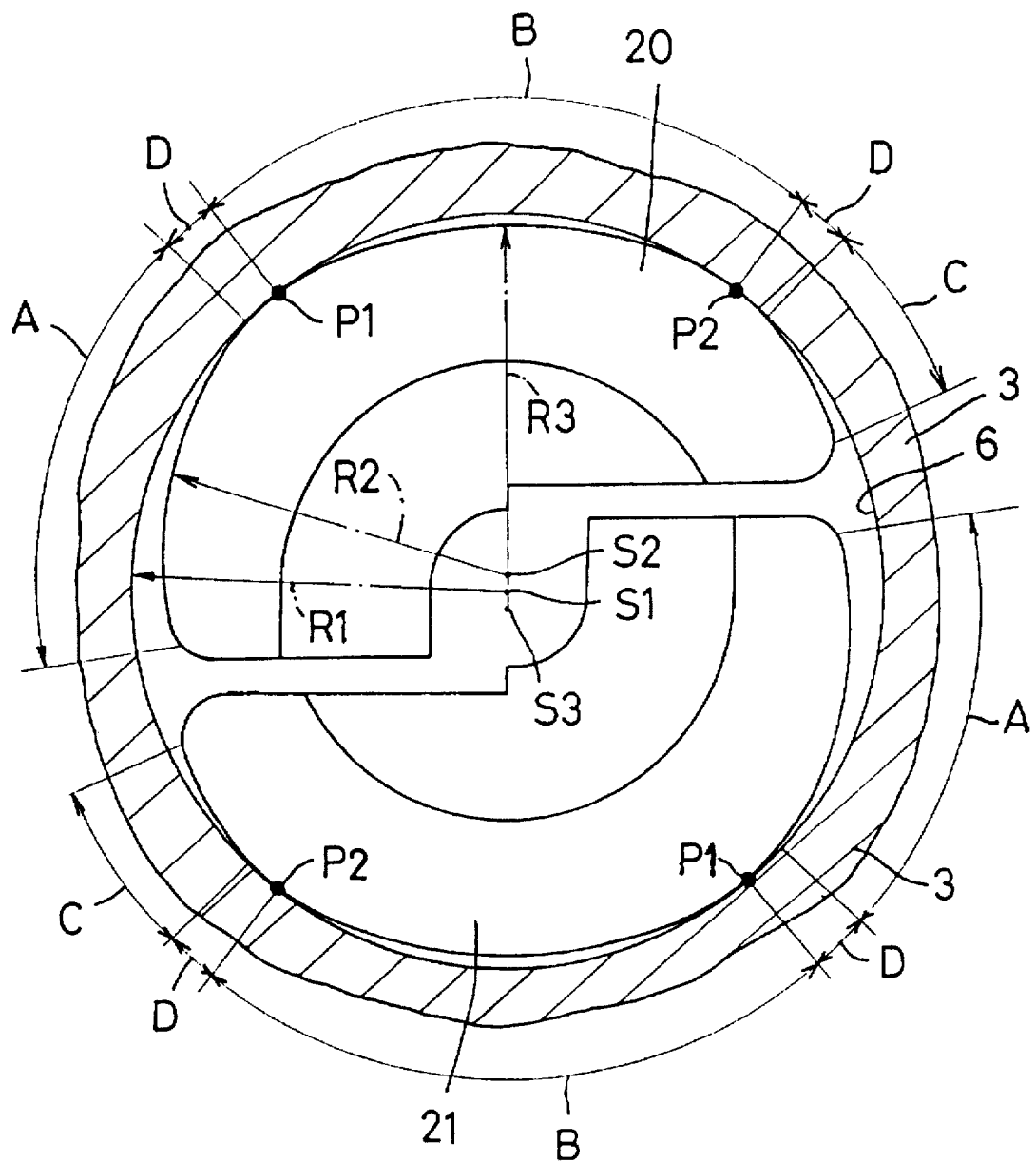
FIG. 2 is a sectional rear view of the rack supporting device of the embodiment of the present invention.

As illustrated in FIG. 2, the outer circumferential face of one half piece 20 has two small diameter portions A and C, one great diameter portion B, and two joint portions D. The two small diameter portions A and C are arranged on a second fictitious cylindrical face having an axis along the back and forth direction. The great diameter portion B, which is arranged between the two small diameter portions A and C, is arranged on a third fictitious cylindrical face having an axis along the back and forth direction. One joint portion D is arranged between one small diameter portion A and the great diameter portion B, and the other joint portion D is arranged between the other small diameter portion A and the great diameter portion. Both circumferential ends of the great diameter portion B constitute contact points P1 and P2 with the inner circumferential face of the guide hole 6.

The radius R2 of the second fictitious cylindrical face is smaller than the radius R1 of the abovementioned first fictitious cylindrical face. The radius R3 of the third fictitious cylindrical face is greater than the radius R1 of the first fictitious cylindrical face.

The axis S1 of the first fictitious cylindrical face is included in a fictitious plane, which includes the axis S2 of the second fictitious cylindrical face and the axis S3 of the third fictitious cylindrical face and which is arranged along the vertical direction. The axis S1 of the first fictitious cylindrical face is arranged between the axis S2 of the second fictitious cylindrical face and the axis S3 of the third fictitious cylindrical face.

The radius of curvature of each of the joint portions D changes gradually from the radius R3 of the third fictitious cylindrical face to the radius R2 of the second fictitious cylindrical face as the measuring point moves from the contact point between the joint portions D and the great diameter portion B to the contact point between the joint portions D and the small diameter portions A and C, whereby the small diameter portions A and C and the great diameter portion B are smoothly continuous with each other.

The outer circumferential face of the other half piece 21 has the same constitution as that of the outer circumferential face of one half piece 20.

According to the above constitution, backlash-free smooth transmission of rotation from the pinion 1 is ensured by pressing the teeth of the rack 2 against the teeth of the pinion 1 by the support yoke 4. By the movement of the support yoke 4 in the back and forth direction, the bending of the rack 2, the tolerance for the tooth cutting of the rack 2, and the like can be absorbed. By limiting the distance of backward shift of the support yoke 4 from the rack 2 to a preset range, the distance of backward shift is prevented from being in excess, whereby poor engagement of the rack 2 with the pinion 1 is prevented.

Each of the two half pieces 20 and 21, which constitute the support yoke 4, is pressed against the inner circumferential face of the guide hole 6 at both circumferential ends P1 and P2 of the great diameter portion B of its outer circumferential face by the elastic force of the spring 8. In case where there is a tolerance for shaping etc., the outer circumferential face of each of the half pieces 20 and 21 is allowed to be pressed against the inner circumferential face of the guide hole 6 not only at the two circumferential ends P1 and P2 of the great diameter portion B but also at any other point between the two circumferential ends. Therefore, each of the half pieces 20 and 21 is pressed against the inner circumferential face of the guide hole 6 at two or more points P1 and P2 which are apart from each other along the circumferential direction. This prevents the support yoke 4 from rotating from the points P1 and P2 contacting with the inner circumferential face of the guide hole 6, thus the supporting of the rack 2 can be stabilized. It is therefore possible to prevent reduction in the capability of the rack 2 to follow up the rotation of pinion 1 and the increment of the sound of collision between the teeth of the rack 2 and the teeth of the pinion 1. Again, because the great diameter portion B and the small diameter portions A and C of the outer circumferential face of each of the half pieces 20 and 21 are smoothly continuous with each other, the shape of each of the half pieces 20 and 21 is not complicated, whereby the mold designing for each of the half pieces 20 and 21, which are made from sintered metal, is facilitated, the reduction in strength of each half piece is prevented because of inhibition of the stress concentration, and the reduction in dimensional precision of each half piece is prevented because of the uniformization of the rate of contraction during sintering owing to the uniformization of the density.

The present invention is not limited to the above mentioned embodiment. For example, the numbers of the great diameter portions and small diameter portions of the outer circumferential face of each half piece are not subject to limitation.

What is claimed is:

1. A supporting device for a rack engaged with a pinion, comprising:

a housing having a guide hole;

a supporting element inserted into the guide hole so as to be guided in a back and forth direction by an inner circumferential face of the guide hole;

the supporting element being made up of a pair of half pieces, front ends of which support a back face of the rack;

means for exerting an elastic force to press both half pieces to a back face of the rack and to the inner circumferential face of the guide hole;

the inner circumferential face of the guide hole being arranged on a first fictitious cylindrical face having a diameter and an axis along the back and forth direction;

the outer circumferential face of each of the half pieces having a small diameter portion and a great diameter portion;

the small diameter portion being arranged on a second fictitious cylindrical face, which has an axis along the back and forth direction and a diameter of which is smaller than that of the first fictitious cylindrical face;

the great diameter portion being arranged on a third fictitious cylindrical face, which has an axis along the back and forth direction and a diameter of which is greater than that of the first fictitious cylindrical face; and the outer circumferential face of each of the half pieces being in contact with the inner circumferential face of the guide hole at circumferential ends of the great diameter portion.

2. The rack supporting device according to claim 1, wherein:

each of the half pieces is made from sintered metal; and wherein the small diameter portion and the great diameter portion of the outer circumferential face of each of the half pieces are smoothly continuous with each other.

3. The rack supporting device according to claim 1, wherein:

there are a plurality of small diameter portions; and wherein the great diameter portion is arranged between the small diameter portions.

4. The rack supporting device according to claim 2, wherein:

there are a plurality of small diameter portions; and wherein the great diameter portion is arranged between the small diameter portions.

* * * * *

UNITED STATES PATENT AND TRADEMARK OFFICE
CERTIFICATE OF CORRECTION

PATENT NO.   : 5,746,285

DATED        : May 5, 1998

INVENTOR(S)  : Masami Yonezawa

It is certified that error appears in the above-identified patent and that said Letters Patent is hereby corrected as shown below:

On the title page, item [56], insert the following

DE  16 05 911    07/1970     Germany

JP  05 238397    09/1993     Japan

JP  06 056042    03/1994     Japan

Signed and Sealed this

Eleventh Day of August 1998

Attest:

Attesting Officer

BRUCE LEHMAN

Commissioner of Patents and Trademarks